Patented June 23, 1953

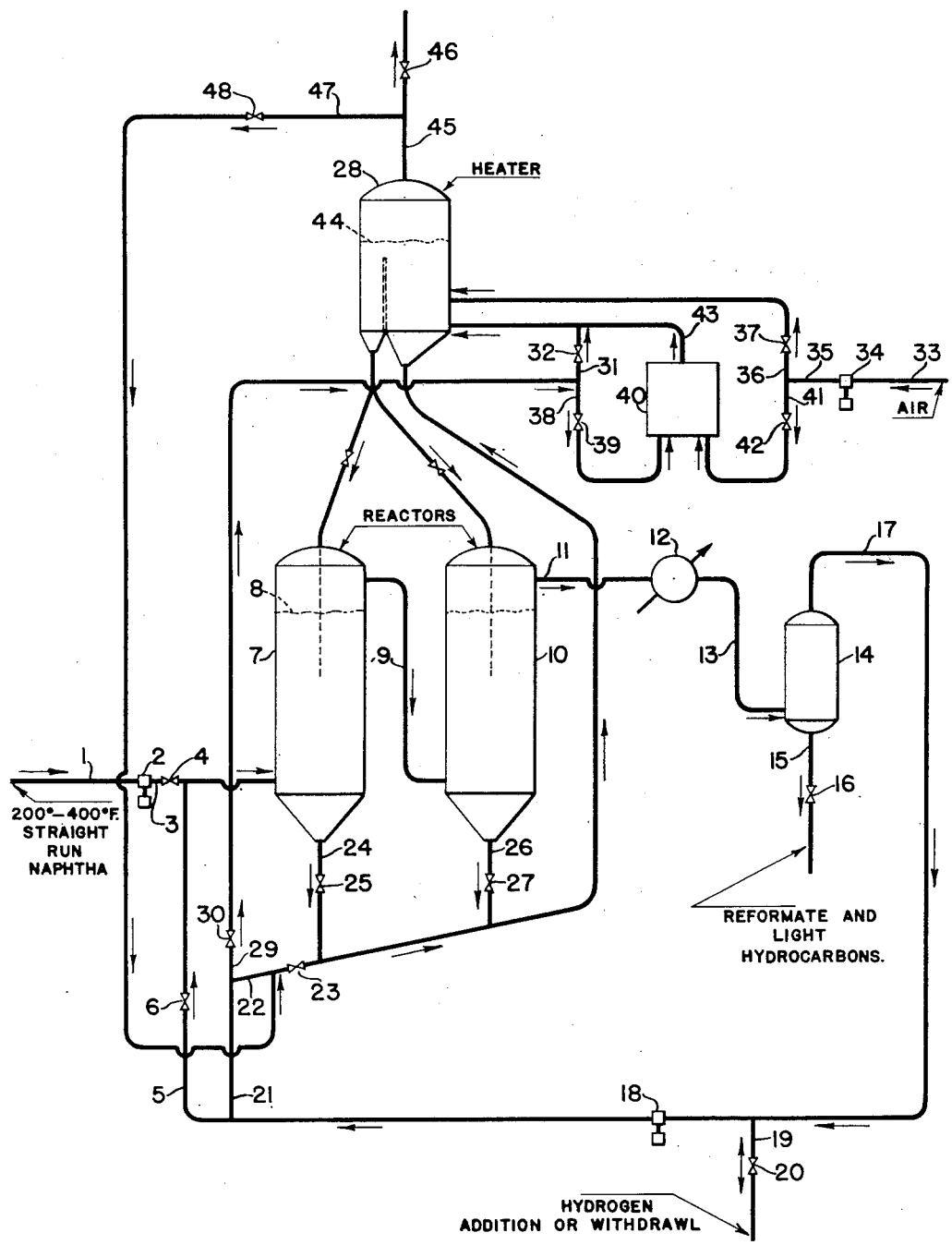

2,643,214

UNITED STATES PATENT OFFICE 2,643,214

METHOD OF REFORMING HYDROCARBONS IN THE PRESENCE OF A PLATINUM OR PALLADIUM CATALYST

Karl T. Hartwig, Glen Ellyn, Ill., assignor to Universal Oil Products Company, Chicago, Ill., a corporation of Delaware Application March 29, 1950, Serial No. 152,656

15 Claims. (Cl. 196—50)

This invention relates to the conversion of hydrocarbons. It is more specifically concerned with the reforming of hydrocarbons boiling within the gasoline range in the presence of moving beds of catalyst comprising platinum and alumina.

Platinum-alumina-combined halogen catalysts of the type described in U. S. Patent Number 2,479,109, issued August 19, 1949, and catalysts comprising platinum and a cracking component, described in U. S. Patent Number 2,478,916, issued August 16, 1949, are especially useful in the reforming of hydrocarbons in the presence of hydrogen. Hydrocracking of paraffins and dehydrogenation of naphthenes are among the principal reactions that are promoted by these catalysts, which are capable of increasing the octane number of straight-run gasolines and naphthas to values that are substantially higher than those that ordinarily can be reached by thermal reforming. In addition, the yield-octane number relationships realized with these catalysts, are much better than are the corresponding relationships obtained in thermal reforming and most of the prior catalytic processes. By an appropriate selection of operating conditions, these catalysts can be used for a number of weeks and even months without regeneration.

Because reforming processes employing catalysts of this type are essentially non-regenerative, and, as a consequence, regeneration facilities are not needed, it has been generally accepted that the most advantageous type of operation is the fixed bed type wherein the catalyst is disposed as a stationary bed or beds in a reaction zone or zones and the reactants are continuously passed therethrough. In actual operation, the preheated reactants have been directed through a plurality of fixed catalyst beds with reheating of the reactants between the beds to compensate for the temperature drop caused by the endothermicity of the reaction. I have found that a number of unexpected advantages as well as greatly increased flexibility can be realized by employing a particular type of moving bed operation in such processes.

In a broad aspect, my invention relates to a process for reforming hydrocarbons boiling approximately within the gasoline range in the presence of a platinum or palladium-containing reforming catalyst wherein the catalyst is continuously cycled between a reaction zone and a heating zone.

In one embodiment my invention relates to a reforming process which comprises passing hydrogen and hydrocarbon fractions containing paraffins and naphthenes and boiling within the gasoline range through a reaction zone and therein contacting the same at reforming conditions with a catalyst comprising alumina and a metal selected from the group consisting of platinum and palladium, withdrawing catalyst from said reaction zone, and introducing the same into a heating zone wherein it is contacted with hot combustion gases to raise the temperatures thereof, withdrawing heated catalyst from the heating zone and passing the same into said reaction zone.

In a more specific embodiment my invention relates to a reforming process which comprises passing hydrogen and hydrocarbon fraction containing paraffins and naphthenes and boiling within the gasoline range through a reaction zone and therein contacting the same at reforming conditions with a catalyst comprising platinum and alumina, cooling the reactor hydrogen-hydrocarbon effluent, separating from the cooled effluent a gaseous stream rich in hydrogen, recycling a first portion of said gaseous stream to the reaction zone, withdrawing catalyst from said reaction zone and suspending the same in a second portion of said gaseous stream, supplying the last-mentioned catalyst to a heating zone, heating the catalyst in said heating zone by contacting the same with hot products formed at least in part by the combustion of a third portion of said gaseous stream, and returning the thus heated catalyst to the reaction zone.

In another specific embodiment my invention relates to a reforming process which comprises passing hydrogen and a hydrocarbon fraction containing paraffins and naphthenes and boiling within the gasoline range through a reaction zone and therein contacting the same at reforming conditions with a catalyst comprising platinum and alumina, cooling the reactor hydrogen-hydrocarbon effluent, separating from the cooled effluent a gaseous stream rich in hydrogen, recycling a first portion of said gaseous stream to the reaction zone, withdrawing catalyst from said reaction zone and suspending the same in a stream comprising hot combustion products prepared as hereinafter described, supplying the last-mentioned catalyst to a heating zone, heating the catalyst in said heating zone by contacting the same with hot products formed at least in part by the combustion of a second portion of said gaseous stream, separating hot gases from the heating zone and using a portion thereof to transport catalyst from the reaction to the heating zone, and passing the heated catalyst from the heating zone to the reaction zone.

In a further specific embodiment my invention relates to a process which comprises passing a mixture of hydrogen and a gasoline fraction serially through a plurality of reactors containing a catalyst comprising platinum and alumina, continuously withdrawing catalyst from each of the reactors and transporting the same to a heating zone and therein increasing the temperature of the catalyst, continuously passing heated catalyst from the heater to each of said reaction zones, and regulating the amount of heated catalyst fed to each reactor to maintain the desired reaction temperature therein.

The charging stocks that may be reformed in accordance with my process comprise hydrocarbon fractions containing naphthenes and paraffins. The preferred stocks are those consisting essentially of naphthenes and paraffins, although in some cases aromatics and/or olefins also may be present. This preferred class includes straight-run gasolines, natural gasolines, and the like. On the other hand, it frequently is advantageous to charge thermally or catalytically cracked gasolines, particularly higher boiling fractions thereof, to my reforming process. If a cracked gasoline or fraction is charged, it usually will be processed in admixture with a straight-run fraction. The gasoline may be full boiling range gasoline having an initial boiling point of from about 50° to about 100° F. and an end boiling point within the range of from about 325° to about 425° F., or it may be a selected fraction thereof which usually will be a higher boiling fraction, commonly referred to as naphtha, and generally having an initial boiling point within the range of from about 125° to about 250° F. and an end boiling point within the range of from about 350° to about 425° F.

The reforming catalysts that may be used in my process comprise those catalysts, comprising at least one refractory oxide composited or associated with platinum or palladium, that are capable of promoting hydrocracking of paraffins and dehydrogenation of naphthenes. A preferred type of catalyst that falls in this category are those described in U. S. Patent Number 2,479,109, issued August 16, 1949. These catalysts comprise alumina, platinum, and combined halogen, especially combined fluorine and combined chlorine. They are prepared by forming a mixture of alumina and a halogen compound, the halogen being in an amount of from about 0.1% to about 1.0% by weight of said alumina on a dry basis, and thereafter compositing about 0.1% to about 1.0% platinum with the mixture, and subsequently heating the composite.

Another group of catalysts that may be used in the present process comprise a cracking component and a metal selected from the group consisting of platinum and palladium. The cracking component ordinarily will comprise silica and at least one other metal oxide, usually selected from the group consisting of alumina, zirconia, magnesia, and thoria. Another type of cracking component that may be used in these catalysts comprise alumina-boria composites. These catalysts are made, for example, by drying a composite of silica hydrogel and alumina hydrogel and thereafter incorporating into the dry composite a metal selected from the group consisting of platinum and palladium in an amount of from about 0.1% to about 1.0%. Further details concerning the preparation of catalysts of this type will be found in U. S. Patent Number 2,478,916.

Hydrocarbon reforming operations carried out in accordance with my invention ordinarily will be conducted at temperatures of from about 600° F. to about 1000° F. if the catalyst comprises a cracking component and a metal selected from the group consisting of platinum and palladium. If the catalyst comprises platinum-alumina-combined halogen, the temperatures ordinarily will lie within the range of from about 750° F. to about 1000° F.

The pressures at which my process will be conducted will lie within the range of from about 50 to 1200 p. s. i., a total pressure of at least 250 pounds ordinarily is preferred. The weight hourly space velocity, defined as the weight of hydrocarbons charged per hour per weight of catalyst in the reaction zone, should lie within the range of from about 0.2 to about 40. The amount of hydrogen charged along with the hydrocarbons usually will be from about 0.5 to about 15 mols per mol of hydrocarbon. However, with certain types of charging stocks and in certain types of operations, sufficient hydrogen is produced in situ so that there is no necessity for charging external hydrogen.

My invention will now be described in more detail in connection with the description of the flow diagram shown in the figure.

Referring to the figure, a 200–400° F. straight-run naphtha is passed through line 1, is picked up by pump 2 and is discharged into line 3 containing valve 4. The stream of straight-run naphtha passing through line 3 is joined by a stream of recycle hydrogen, prepared as hereinafter described, passing through line 5 containing valve 6. The commingled streams enter reactor 7 near the bottom. In this particular example, reactor 7 contains finely divided reforming catalyst comprising alumina containing 0.3% platinum and 0.3% combined fluorine. The straight-run naphtha and/or the recycle hydrogen may be preheated prior to introduction into reactor 7. If preheating is employed, the amount of heat carried into the reactor by means of the circulated catalyst will be smaller than if preheating is not employed. At any event, the temperature in the reactor can be controlled by the amount and temperature of catalyst charged to the reactor per unit time and also by the degree of preheating of the reactants charged to the reactor.

The catalyst in the reactor is maintained in a fluidized state by the upwardly flowing reactants. A lower dense phase and an upper dilute phase exist in the reactor, the approximate line of demarcation between the two phases being indicated by dotted line 8 in the drawing. The reactants passing upwardly through reactor 7 are passed through separation means such as a cyclone separator to remove entrained catalyst which is returned to the dense phase, and the substantially catalyst-free partially converted products and unconverted charging stock are withdrawn from reactor 7 through line 9 and introduced near the bottom of reactor 10. This reactor contains catalyst of the type present in reactor 7. A dense phase and a dilute phase as well as catalyst separation means also are present in the reactor.

The hydrogen-hydrocarbon effluent withdrawn from reactor 10 through line 11 is passed through condenser 12 and then through line 13 and is introduced into receiver 14. Liquefied reformate and light hydrocarbons are withdrawn from receiver 14 through line 15 containing valve 16 and are sent to stabilization and fractionating means. A gaseous stream predominating in hydrogen, but containing some methane, is withdrawn from receiver 14 through line 17 and is compressed to the necessary working pressure by compressor 18. Excess hydrogen may be withdrawn from the system or additional hydrogen may be added to the system through line 19 containing valve 20. A portion of the hydrogen stream flowing through line 17 is directed through line 5 containing valve 6 and is returned to the reactor system. Another portion is directed into line 21 and then sent to line 22 containing valve 23. Catalyst is withdrawn from reactor 7 and passed through line 24 containing valve 25 and is picked up by the gases flowing through line 22. Similarly, catalyst is withdrawn from reactor 10 through line 26 containing valve 27 and is commingled with the stream of gases and catalyst flowing through line 22. The suspension of catalyst in the recycle gas is transported into heater 28 near the bottom.

Another portion of the stream of hydrogen passing through line 21 is directed through line 29 containing valve 30 and, in one embodiment of my invention, is passed through line 31 containing valve 32 and into heater 28 near the bottom. In this embodiment, an oxygen-containing stream, shown as air in this example, is passed through line 33, is picked up by compressor 34, and is discharged into line 35, line 36 containing valve 37, and is introduced into heater 28 at a point above that at which the hydrogen stream is introduced into said heater.

If it is desired to avoid exposure of the catalyst to an oxidizing atmosphere, the amount of hydrogen introduced into the heater should be substantially in excess of the stoichiometric amount needed for combustion with the oxygen introduced into said heater. This will maintain a substantially reducing atmosphere in all portions of the catalyst bed in the reactor. Another method of avoiding an oxidizing atmosphere in the heater 28 is to pass the hydrogen stream flowing through line 29 into line 38 containing valve 39 and into burning chamber 40. Air is introduced through line 41 containing valve 42 and combustion takes place in chamber 40. The hot products of combustion are then withdrawn through line 43 and introduced into heater 28. The amount of combustion taking place in heater 28, or the amount and temperature of the products of combustion introduced into heater 28 are regulated to raise the temperature of the catalyst withdrawn from the heater to the desired value. A dense phase of fluid catalyst and a dilute phase of liquid catalyst are maintained in heater 28, the line of demarcation being indicated by dotted line 44 in the reactor. The gases to be withdrawn from heater 28 are passed through a cyclone separator to remove entrained catalyst which is returned to the dense phase in the heater and the substantially catalyst-free gases are then withdrawn through line 45 containing valve 46. For purposes of heat economy, a portion of the hot gases withdrawn from heater 28 may be passed through line 47 containing valve 48 and introduced into line 22 for the purpose of transporting catalyst from reactors 7 and 10 to said heater.

It is to be understood that the flow diagram shown in the drawing is given for illustrative purposes only and not for purposes of limitation. A number of variations may be made in the process described without departing from the spirit or scope of my invention. For example, one reactor may be employed instead of the two shown in the diagram or, if desired, three or more reactors may be used. When more than one reactor is employed the temperature levels maintained in the different reactors may be varied. This is of benefit in some cases since it permits the different reactions that take place during reforming to be carried out at temperatures that are optimum for each particular reaction. Thus, for example, dehydrogenation, which ordinarily is faster than hydrocracking, can be carried out at one temperature in the first reactor and hydrocracking can be carried out in another reactor at another temperature. Again, in the example given, the heater is located above the reactors and the catalyst flows from the heater to the reactors by means of gravity. If desired, the heater may be placed below the reactors and the catalyst may flow from the reactors to the heater by means of gravity and then be carried from the heater to the reactors by means of a gas lift or the like. If a gas lift is employed, the transporting gas and catalyst may be separated outside the processing vessels and then the separated catalyst permitted to flow into the vessel in dense phase. Mechanical lifting or conveying apparatus such as bucket-type conveyors, friction-type conveyors and the like, may be used in place of the gas lift. Although I have described a fluidized catalyst system for use in my process, it is to be understood that a compact moving bed type of process also may be employed. In such a case, it may be desirable in some instances to employ co-current flow of reactants and catalysts or of reactants and combustion gases, rather than countercurrent flow as illustrated.

The flexibility of the process that I described is one of its principal advantages. A number of different gas streams may be used alone or in combination for transporting the catalyst between the reactors and the heating zone. Again, the combustion that supplies the heat necessary for raising the temperature of the catalyst may take place within or outside of the heater. Further, the temperatures within the different reactors can be independently controlled. Additional aspects of the flexibility of my process will become apparent from the following list of advantages that result from the use of my process, as compared with the fixed bed type of processing hereinbefore described. These advantages are:

1. A lower pressure drop through the reactor system, resulting in appreciably lower compression costs.

2. The replacement of a plurality of intermediate heaters with a single heater.

3. If desired, the replacement of a number of reactors with a single reactor.

4. A longer catalyst life may be obtained with feed stocks that possess high carbon forming tendencies by continuously removing a portion of the carbon deposit from the catalyst in the heating zone. In such an operation, an oxidizing atmosphere should be maintained in the heater.

5. Certain charging stocks contain small amounts of chlorine compounds which tend to become associated with the catalyst, thereby increasing the hydrocracking activity of the same beyond the desired level. The exposure of the catalyst to water vapors in the heater will tend to keep the chlorine content of the catalyst at a constant value.

6. Certain straight-run gasolines and the like, notably those from the California area, contain appreciable quantities of nitrogen compounds which tend to deactivate the catalyst. These compounds will be removed to a large extent in the heating zone.

7. In the usual operation, sufficient hydrogen is produced in the process to take care of the transporting gas and fuel gas requirements. Consequently, it is not necessary to use extraneous transporting or fuel gases. Thus, costs of compression are appreciably lowered since the hydrogen obtained from the receiver in the present process needs to be compressed only a few pounds to be utilized further.

Thus, it can be seen that I have provided a method of conducting reforming operations that is essentially self-sufficient and possess a number of distinctive advantages over the processes proposed and set forth in the prior art.

I claim as my invention:

1. A reforming process which comprises passing hydrogen and a hydrocarbon fraction containing paraffins and naphthenes and boiling within the gasoline range through a reaction zone and therein contacting the same at reforming conditions with a catalyst comprising alumina and a metal selected from the group consisting of platinum and palladium, withdrawing catalyst from said reaction zone and introducing the same into a heating zone wherein it is contacted with hot combustion gases to raise the temperature thereof, withdrawing heated catalyst from the heating zone and passing the same into said reaction zone, separating a gas rich in hydrogen from the reformed products and burning at least a portion thereof to form said combustion gases.

2. The process of claim 1 further characterized in that said catalyst comprises platinum, alumina, and combined halogen.

3. The process of claim 1 further characterized in that said catalyst comprises alumina containing about 0.1–1.0% platinum and about 0.1–1.0% combined fluorine.

4. A reforming process which comprises passing hydrogen and a hydrocarbon fraction containing paraffins and naphthenes and boiling within the gasoline range through a reaction zone and therein contacting the same at reforming conditions with a catalyst comprising platinum and alumina, cooling the reactor hydrogen-hydrocarbon effluent, separating from the cooled effluent a gaseous stream rich in hydrogen, recycling a first portion of said gaseous stream to the reaction zone, withdrawing catalyst from said reaction zone and suspending the same in a second portion of said gaseous stream, supplying the last-mentioned catalyst to a heating zone, heating the catalyst in said heating zone by contacting the same with hot products formed at least in part by the combustion of a third portion of said gaseous stream, and returning the thus heated catalyst to the reaction zone.

5. The process of claim 4 further characterized in that said combustion is conducted outside said heating zone.

6. The process of claim 4 further characterized in that said combustion is conducted within said heating zone.

7. The process of claim 4 further characterized in that said combustion is conducted within said heating zone in the presence of an excess of the gaseous stream of hydrogen and hydrocarbon.

8. A reforming process which comprises passing hydrogen and a hydrocarbon fraction containing paraffins and naphthenes and boiling within the gasoline range through a reaction zone and therein contacting the same at reforming conditions with a catalyst comprising platinum and alumina, cooling the reactor hydrogen-hydrocarbon effluent, separating from the cooled effluent a gaseous stream rich in hydrogen, recycling a first portion of said gaseous stream to the reaction zone, withdrawing the catalyst from said reaction zone and suspending the same in a stream comprising hot combustion products prepared as hereinafter described, supplying the last-mentioned catalyst to a heating zone, heating the catalyst in said heating zone by contacting the same with hot products formed at least in part by the combustion of a second portion of said gaseous stream, separating hot gases from the heating zone and using a portion thereof to transport catalyst from the reaction zone to the heating zone, and passing the heated catalyst from the heating zone to the reaction zone.

9. The process of claim 8 further characterized in that said combustion is conducted outside said heating zone.

10. The process of claim 8 further characterized in that said combustion is conducted within said heating zone.

11. The process of claim 8 further characterized in that said combustion is conducted within said heating zone in the presence of an excess of the gaseous stream of hydrogen and hydrocarbons.

12. A hydrocarbon conversion process which comprises reforming a gasoline fraction in the presence of hydrogen and in contact with a platinum-containing catalyst in a reaction zone, removing catalyst from said zone and supplying the same to a heating zone, separating a gas rich in hydrogen from the reformed products, recycling a portion of said gas to the reaction zone, burning another portion of said gas and contacting resultant hot combustion products with the catalyst in said heating zone, and returning heated catalyst from the heating zone to the reaction zone.

13. The process of claim 12 further characterized in that the second-mentioned portion of said gas is burned within said heating zone.

14. The process of claim 12 further characterized in that the second-mentioned portion of said gas is burned outside said heating zone.

15. A process which comprises passing a mixture of hydrogen and a gasoline fraction serially through a plurality of reactors containing a catalyst comprising platinum and alumina, continuously withdrawing catalyst from each of the reactors and transporting the same to a heating zone and therein increasing the temperature of the catalyst, continuously passing heated catalyst from the heater to each of said reactors, separating a gas rich in hydrogen from the reformed products, utilizing a portion of said gas to transport catalyst from each of the reactors to the heating zone, burning another portion of said gas and contacting resultant hot combustion products with the catalyst in the heating zone.

KARL T. HARTWIG.

References Cited in the file of this patent

UNITED STATES PATENTS

| Number | Name | Date |
|---|---|---|
| 2,403,375 | Kassel | July 2, 1946 |
| 2,479,110 | Haensel | Aug. 16, 1949 |